J. C. & D. P. LEONARD.
Hop Frame.
No. 64,679. Patented May 14, 1867.
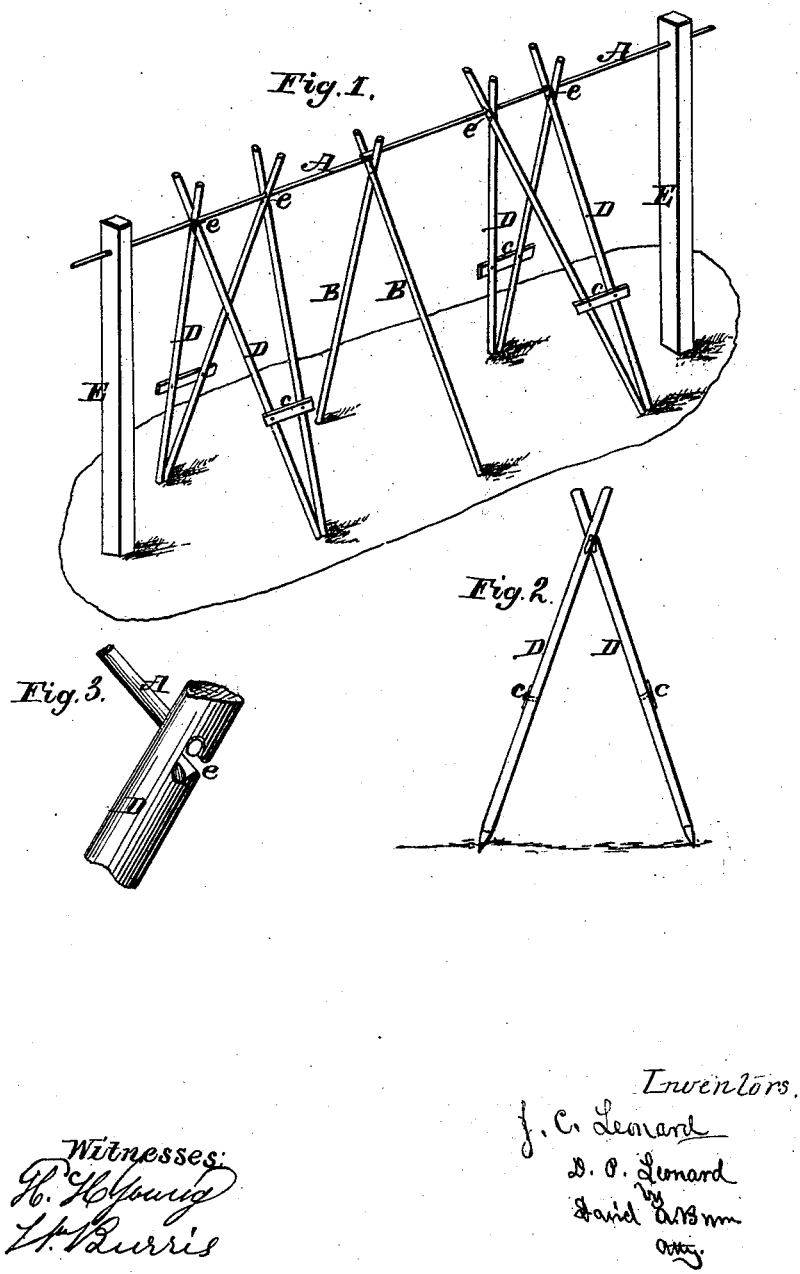

JOSEPH C. AND DELOS P. LEONARD, OF UNION CITY, MICHIGAN.

Letters Patent No. 64,679, dated May 14, 1867.

HOP-FRAMES.

The Schedule referred to in these Letters Patent and making part of the same.

TO ALL WHOM IT MAY CONCERN:

Be it known that we, JOSEPH C. LEONARD and DELOS P. LEONARD, of Union City, Branch county, State of Michigan, have invented a new and improved Frame or Trellis for Hops or other running vines; and we do hereby declare that the following is a full and exact description thereof, reference being had to the accompanying drawings, forming a part of this specification.

The nature of our invention consists in extending and stretching wires across the hop-field, between alternate rows of hills, fastening the same at either end to posts firmly and permanently secured in the ground, and supporting them at proper intervals along the rows by means of braces or shears, and in securing upon said wires the upper ends of suitable hop-poles placed in each hill, a hook or kerf being formed in each of said poles at or near its top to embrace the wire; also in bracing each pair of hop-poles in a hop-hill by means of a cross-strip between the two, as illustrated at $c$ in Figure 1 of the drawings.

The wires A, tightly stretched, and also firmly braced at intervals by shears B, give a fixed and secure support to the hop-poles D against winds and storms, admitting of a ready removal of the poles when the vines have matured, and allowing also the use of sawed or other poles unsuitable for supporting the vines if merely set in the ground in the ordinary manner.

To enable others familiar with the cultivation of hops and similar crops to use our improvement, we will proceed to describe the manner of constructing and using the same.

We first prepare our poles, D, for the vines by sharpening them on two sides at the upper end, and then form a hook or kerf, $e$, (Figure 3,) in this end, by boring two quarter-inch holes one inch apart through the same near the top, and sawing from the side of the pole to each of said holes, and then splitting out the timber between them, so as to form a hook-shaped slot, $e$, as shown in fig. 3 of the drawings. A quarter-inch hole is then bored through each pole, four or five feet from its lower end, as shown in dotted lines, Figure 2, to receive the pin projecting from one end of a brace, $c$, fig. 1, which we use to couple and strengthen each pair of poles placed in a hill. The braces to be thus used (see $c\ c$, in fig. 1,) consist simply of a narrow board or strip of wood, having a nail or pin projecting from each end thereof to fit into the holes pierced in the poles to receive them, as just described, in the manner illustrated at $c$ in fig. 1. Having our poles and braces all prepared, we set posts E E firmly in the ground at each end of the rows of vines in a field, about ten or twelve feet therefrom, and in a line about midway between every two rows alternately, and also place the shears (illustrated at B B, fig. 1,) firmly in the ground at intervals along the line between the posts. We then extend substantial wires or wire chains A across the field between the posts, winding them once around one arm of each set of shears B, fig. 1, along the line, and fasten the ends thereof securely to the posts E. We then place one or more poles, D, in each hop-hill on the outside thereof, using by preference two for every hill, planting them in the ground deeply enough to prevent their slipping back, and incline them over against the wires, with which they engage, and to which they become secured by means of their hook-shaped slots $e\ e$. Where two poles are used in a hill, they are made to incline not only towards the wire support, but from each other laterally, and are then braced by the braces hereinbefore described as shown at $c\ c$, fig. 1. When deemed advisable, one wire may be used with each and every row of hops, and in such case we prefer to plant the poles on the inside of the hills.

Having thus fully described our invention, we claim therein as new, and desire to secure by Letters Patent—

Our improved hop-frame or trellises, constructed of inclined stakes or poles D D, supported by horizontal wires or chains A, stretched and secured as herein described, all substantially in the manner and for the purpose herein set forth.

JOSEPH C. LEONARD,
DELOS P. LEONARD.

Witnesses:
EDWIN PERRY,
JAS. T. LEONARD.